United States Patent
Spinks et al.

(10) Patent No.: US 7,640,334 B2
(45) Date of Patent: Dec. 29, 2009

(54) NETWORK RESOURCE LOCATION DETECTION PROBE APPARATUS AND METHOD

(75) Inventors: John Spinks, Southrop (GB); Glenn M. Stephens, Hungerford (GB)

(73) Assignee: Frontrange Solutions, Pleasanton, CA (US)

( * ) Notice: Subject to any disclaimer, the term of this patent is extended or adjusted under 35 U.S.C. 154(b) by 1291 days.

(21) Appl. No.: 09/764,543

(22) Filed: Jan. 18, 2001

(65) Prior Publication Data

US 2001/0029534 A1      Oct. 11, 2001

Related U.S. Application Data

(60) Provisional application No. 60/176,581, filed on Jan. 18, 2000.

(51) Int. Cl.
    G06F 15/177    (2006.01)
    G06F 15/173    (2006.01)

(52) U.S. Cl. .............. 709/224; 709/220; 709/222; 709/223

(58) Field of Classification Search ........ 709/223, 709/224
    See application file for complete search history.

(56) References Cited

U.S. PATENT DOCUMENTS

| | | | |
|---|---|---|---|
| 5,434,775 A * | 7/1995 | Sims et al. ............... 705/8 |
| 5,590,056 A | 12/1996 | Barritz ............... 364/550 |
| 5,706,440 A | 1/1998 | Compliment et al. |
| 5,826,103 A * | 10/1998 | Whittaker ............. 709/220 |
| 5,926,462 A | 7/1999 | Schenkel et al. ........ 370/254 |
| 5,933,416 A | 8/1999 | Schenkel et al. ........ 370/254 |
| 6,046,988 A | 4/2000 | Schenkel et al. ........ 370/254 |
| 6,122,639 A * | 9/2000 | Babu et al. ........... 707/103 R |
| 6,480,889 B1 * | 11/2002 | Saito et al. ............ 709/223 |
| 6,501,761 B1 * | 12/2002 | Pannell et al. .......... 370/403 |
| 6,507,869 B1 * | 1/2003 | Franke et al. .......... 709/224 |
| 6,640,246 B1 * | 10/2003 | Gary et al. ............ 709/223 |
| 6,721,818 B1 * | 4/2004 | Nakamura ............. 709/224 |
| 6,731,596 B1 * | 5/2004 | Chiang et al. .......... 370/217 |
| 2002/0026631 A1 | 2/2002 | Barritz ................. 717/127 |

FOREIGN PATENT DOCUMENTS

| | | |
|---|---|---|
| CA | 2420460 | 2/2002 |
| WO | WO 02/17080 | 2/2002 |

* cited by examiner

*Primary Examiner*—Hassan Phillips
(74) *Attorney, Agent, or Firm*—Pate Pierce & Baird

(57) ABSTRACT

Apparatus and method for network device information collection and change detection. An apparatus may include a reporting module hosted on a PC connected to a network. The reporting module may query an intelligent network infrastructure device (i.e. switch, router, hub, etc.) to obtain end point connection information corresponding to the PC. The apparatus may also include a correlation module to associate the end point connection information to a location identifier corresponding to the physical location at which the PC is actually installed. The reporting module may transmit the end point connection information to a central database.

10 Claims, 15 Drawing Sheets

Infrastructure Records

| Location ID | Country | State/ Province | Site Name | Site Address | Bldg ID | Room ID | Room Position | Other |
|---|---|---|---|---|---|---|---|---|
| | | | | | | | | |
| | | | | | | | | |
| | | | | | | | | |
| | | | | | | | | |
| | | | | | | | | |
| | | | | | | | | |
| | | | | | | | | |
| | | | | | | | | |
| | | | | | | | | |
| | | | | | | | | |

Device Records 210　　　　　　182

| Device ID No.: ____ | Location ID: ____ |
|---|---|
| 211 — Part Corresponding to a Network Infrastructure Device ||
| 212 — NIC No. ||
| 214 — Device Type ||
| 216 — Manufacturer ||
| 218 — Model ||
| 220 — Memory ||
| 222 — Disk Space ||
| 224 — Attached Devices ||
| 226 — Installed Software ||
| 228 — Hardware Nomenclature ||
| 227 — Registration Status ||
| 229 — Last Updated ||
| 230 — Other ||

FIG. 9

| Part ID No. | Location ID |
|---|---|
| | |
| | |
| | |
| | |
| | |

FIG. 10

NETWORK RESOURCE LOCATION DETECTION PROBE APPARATUS AND METHOD

RELATED INVENTIONS

This application claims priority to U.S. Provisional Patent Application Ser. No. 60/176,581, entitled NETWORK RESOURCE LOCATION DETECTION PROBE APPARATUS AND METHOD filed on Jan. 18, 2000, which is incorporated herein by reference.

BACKGROUND

1. The Field of the Invention

The invention relates generally to computer systems, and more specifically to methods and apparatus for physically locating and tracking devices connected to a network from a central point using the network cable infrastructure to which the devices connect.

2. Background

The computer age has advanced from analog computers having hard-wired program instructions up through programmable digital computers, and now highly networked programmable digital computers sharing information and applications across the world. With the advent of the computer as a business tool, nearly every profession now requires access to a computer in order to properly complete the daily routine of a job. Most of these computers are networked to share information and resources.

A computer network generally includes a number of intelligent network infrastructure devices, including without limitation switches, routers, hubs, and others, connected so as to allow communication among other network devices and end station devices, such as personal computers ("PCs"), servers, printers, scanners, fax machines, and the like. As the need for access to computer resources grows the number and size of networks grow. The devices comprising today's computer networks may constitute significant resource investments for the organizations that sponsor and manage such networks. Accordingly, such organizations have an inherent interest in maintaining an inventory of all devices comprising organizational networks. Moreover, constant advances in technology demand ongoing upgrades to both network hardware and software. To keep up with such technology advances, an organization must maintain an inventory of the current hardware and software configurations connected to its networks.

Past approaches to collecting information regarding network devices and software suffer from several distinct disadvantages. For example, many organizations perform inventories of network devices by conducting "walk around audits." This is a common practice whereby organizations send people around their organization to determine the physical locations of PCs and other network-based information technology equipment. The information gathered in such "walk around audits" is often entered into a database to facilitate future reference. Although walk around audits may result in a fairly complete and accurate snapshot of a network's hardware and software configurations, such audits are very resource-intensive, typically requiring a great deal of human time and effort for completion. The information garnered in such walk around audits typically also quickly becomes obsolete due to the movement, addition, and deletion of both hardware and software connected to the network.

Walk around audits also typically include only an inventory or listing of devices connected to a network and software installed on those devices without any kind of designation or map of the physical location of the devices connected to the network. In view of the foregoing, the information technology staffs of most organizations typically possess device and software inventories that are out of date and are, therefore, incomplete due to movement of devices as well as additions and deletions of both network devices and software installations. Moreover, the IT staffs of these organizations typically do not possess up to date maps or diagrams showing accurate associations between physical locations at which networks are installed and the physical layout of network devices at such physical locations.

Based on the foregoing, it is clearly desirable to have a network information collection mechanism that can maintain an accurate inventory of all hardware devices connected to a network and all software installed on those network devices.

It is also desirable to have a network information collection system that associates the physical layout of the sites at which a network is installed with the physical network devices and structural cabling comprising the network.

It is also desirable to have a network information collection system that can detect changes in the network, including without limitation movement of devices, addition of devices, removal of devices, and changes in software installations and configurations.

What is needed is a new method and apparatus for obtaining inventories of network devices and software installations. Particularly, what is needed is a system capable of obtaining and maintaining over time an accurate inventory of all devices connected to a network and software installed on those devices, including without limitation the physical location of each device connected to the network.

BRIEF SUMMARY AND OBJECTS OF THE INVENTION

In view of the foregoing, it is a primary object of the present invention to provide a method and apparatus having the capability to positively identify the physical location, as well as the configuration, of computer hardware and software by means of remote probing over known routes of physical connecting lines.

Consistent with the foregoing objects, and in accordance with the invention as embodied and broadly described herein, an apparatus and method are disclosed, in suitable detail to enable one of ordinary skill in the art to make and use the invention. In certain embodiments, an apparatus and method in accordance with the present invention may include software, hardware, firmware, or any combination thereof to implement the process of the invention.

This invention associates the physical location of a network connected device to its first connection to an intelligent network infrastructure device such as a switch, router, or hub. Further, this invention provides a method of tracking movement of network devices by observing changes in connection information in said devices. Such association is possible, because inter-office connections typically use structured cabling, which is permanent and diagramed, whereas network devices (such as PCs) are frequently moved within an organization.

The end point connection information for every device on the network is obtained by each PC on the network accessing its nearest network infrastructure device to obtain the end point connection information about itself and any other local devices to itself on the network. this information is then returned to a central database.

The information in the central database can then be associated by the system administrator to physical locations within the building (e.g. Floor 1, office 1-Sales).

Further, as network devices are relocated within the building this information is continually tracked and the new location information is automatically updated to reflect the new end point.

In certain embodiments, an apparatus in accordance with the present invention may include a reporting module, typically hosted on a PC connected to a network, that is capable of querying an intelligent network infrastructure device, such as a switch, a router, or a hub, to obtain end point connection information corresponding to the PC. The apparatus may also include a correlation module capable of associating the end point connection information acquired by the PC to a location identifier corresponding to the physical location at which the PC is actually installed at the physical site of the network. The end point connection information obtained by the PC may simply be the port number of the network infrastructure device to which the PC is connected via structural cabling.

The reporting module may transmit the end point connection information to a central database hosted on a server computer connected to the network. The reporting module may also include an update module capable of detecting changes in end point connection information corresponding to a PC connected to the network, which changes may be occasioned by movement of the PC from one location to another on the network or removal of the PC from the network.

The reporting module may also include an inventory module capable of detecting other network devices, such as printers or scanners, connected to the network and local to a PC or workstation connected to the network, which may obtain end point connection information on behalf of the other network devices. The apparatus may also include a monitoring module, which is typically hosted on the server computer, capable of receiving end point connection information from reporting modules, typically hosted on network PCs or workstations.

The correlation module may also include a matching module capable of matching software license records to the software installed on devices connected to the network to determine whether the organization has sufficient software licenses to cover actual software installations on the network. Moreover, the correlation module may include a device recognition module capable of identifying the nomenclature of devices connected to the network. The inventory module may also be capable of detecting software and hardware configuration information of all devices connected to the network.

A method in accordance with the invention may include the steps of querying a network infrastructure device to obtain end point connection information corresponding to a PC or workstation connected to the network, reporting the end point connection information to a central database, and associating the end point connection information corresponding to the PC or workstation to a location identifier corresponding to a physical location at which the PC or workstation is then presently installed.

The central database may include device records storing end point connection information corresponding to devices connected to the network. The method may also include the steps of detecting a change of end point connection information corresponding to the PC or workstation and updating the central database to reflect the change.

The method may also include the steps of detecting a network device local to the PC or workstation and obtaining end point connection information corresponding to the network device local to the PC or workstation. The method may also include the step of matching software license records to software applications installed on devices connected to the network to determine the organization's legal compliance with applicable licensing requirements.

The method may further include the step of identifying the nomenclature of devices connected to the network based on product recognition records stored in the central database. The method may also include the step of detecting software and hardware configuration information corresponding to devices connected to the network. The method may include the step of transmitting the software and hardware configuration information corresponding to devices connected to the network to the central database.

BRIEF DESCRIPTION OF THE DRAWINGS

The foregoing and other objects and features of the present invention will become more fully apparent from the following description and appended claims, taken in conjunction with the accompanying drawings. Understanding that these drawings depict only typical embodiments of the invention and are, therefore, not to be considered limiting of its scope, the invention will be described with additional specificity and detail through use of the accompanying drawings in which:

FIG. 8 is a chart illustrating one embodiment of an infrastructure database including infrastructure records in accordance with the invention;

FIG. 9 is a chart illustrating one embodiment of device record bound to a location identification in accordance with the invention;

FIG. 10 is a chart illustrating one embodiment of a binding table for mapping device identification numbers to location identifications in accordance with the invention;

DETAILED DESCRIPTION OF THE PREFERRED EMBODIMENTS

It will be readily understood that the components of the present invention, as generally described and illustrated in the Figures herein, could be arranged and designed in a wide variety of different configurations. Thus, the following more detailed description of the embodiments of the system and method of the present invention, as represented in FIGS. 1 through 15, is not intended to limit the scope of the invention, as claimed, but it is merely representative of the presently preferred embodiments of the invention.

The presently preferred embodiments of the invention will be best understood by reference to the drawings, wherein like parts are designated by like numerals throughout.

Those of ordinary skill in the art will, of course, appreciate that various modifications to the details illustrated in the schematic diagrams of FIGS. 1-15 may easily be made without departing from the essential characteristics of the invention. Thus, the following description is intended only as an example, and simply illustrates one presently preferred embodiment consistent with the invention as claimed herein.

Figure 1:
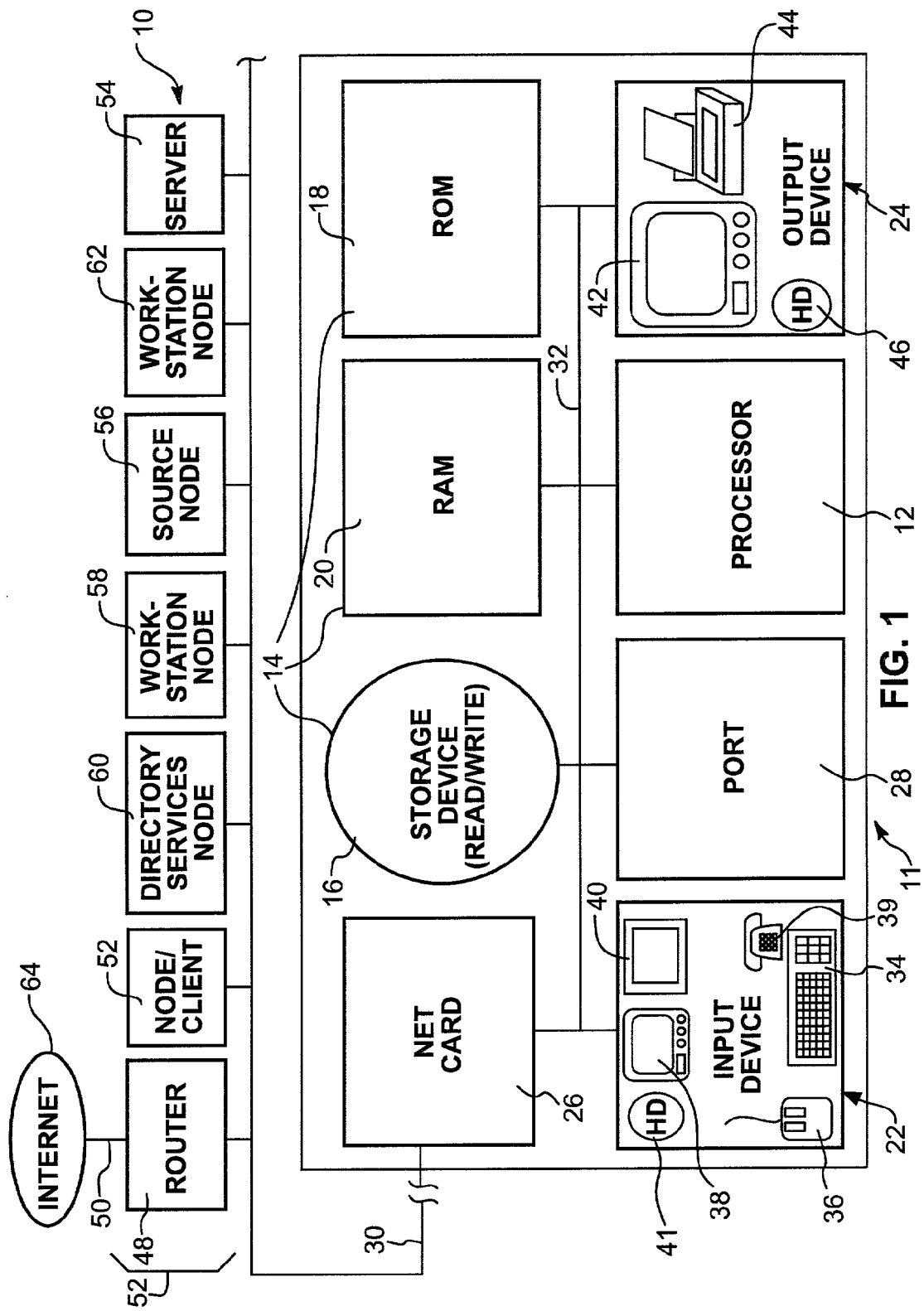
FIG. 1 is a schematic block diagram of one architecture for a hardware suite suitable for implementing an apparatus in accordance with the present invention.

Referring now to FIG. 1, an apparatus 10 may include a node 11 (client 11, computer 11) containing a processor 12 or CPU 12. The CPU 12 may be operably connected to a memory device 14. A memory device 14 may include one or more devices such as a hard drive 16 or non-volatile storage device 16, a read-only memory 18 (ROM) and a random-access (and usually volatile) memory 20 (RAM).

The apparatus 10 may include an input device 22 for receiving inputs from a user or another device. Similarly, an output device 24 may be provided within the node 11, or accessible within the apparatus 10. A network card 26 (interface card) or port 28 may be provided for connecting to outside devices, such as the network 30.

Internally, a bus 32 (system bus 32) may operably interconnect the processor 12, memory devices 14, input devices 22, output devices 24, network card 26 and port 28. The bus 32 may be thought of as a data carrier. As such, the bus 32 may be embodied in numerous configurations. Wire, fiber optic line, wireless electromagnetic communications by visible light, infrared, and radio frequencies may likewise be implemented as appropriate for the bus 32 and the network 30.

Input devices 22 may include one or more physical embodiments. For example, a keyboard 34 may be used for interaction with the user, as may a mouse 36. A touch screen 38, a telephone 39, or simply a telephone line 39, may be used for communication with other devices, with a user, or the like.

Similarly, a scanner 40 may be used to receive graphical inputs which may or may not be translated to other character formats. A hard drive 41 or other memory device 14 may be used as an input device whether resident within the node 11 or some other node 52 (e.g., 52a, 52b, etc.) on the network 30, or from another network 50.

Output devices 24 may likewise include one or more physical hardware units. For example, in general, the port 28 may be used to accept inputs and send outputs from the node 11. Nevertheless, a monitor 42 may provide outputs to a user for feedback during a process, or for assisting two-way communication between the processor 12 and a user. A printer 44 or a hard drive 46 may be used for outputting information as output devices 24.

In general, a network 30 to which a node 11 connects may, in turn, be connected through a router 48 to another network 50. In general, two nodes 11, 52 may be on a network 30, adjoining networks 30, 50, or may be separated by multiple routers 48 and multiple networks 50 as individual nodes 11, 52 on an internetwork. The individual nodes 52 may have various communication capabilities.

In certain embodiments, a minimum of logical capability may be available in any node 52. Note that any of the individual nodes 52 may be referred to, as may all together, as a node 52 or nodes 52.

A network 30 may include one or more servers 54. Servers may be used to manage, store, communicate, transfer, access, update, and the like, any number of files for a network 30. Typically, a server 54 may be accessed by all nodes 11, 52 on a network 30. Nevertheless, other special functions, including communications, applications, and the like may be implemented by an individual server 54 or multiple servers 54.

In general, a node 11 may need to communicate over a network 30 with a server 54, a router 48, or nodes 52. Similarly, a node 11 may need to communicate over another network (50) in an internetwork connection with some remote node 52. Likewise, individual components of the apparatus 10 may need to communicate data with one another. A communication link may exist, in general, between any pair of devices or components.

By the expression "nodes" 52 is meant any one or all of the nodes 48, 52, 54, 56, 58, 60, 62, 11. Thus, any one of the nodes 52 may include any or all of the component parts illustrated in the node 11.

The directory services node 60 provides the directory services as known in the art. Accordingly, the directory services node 60 hosts the software and data structures required for providing directory services to the nodes 52 in the network 30 and may do so for other nodes 52 in other networks 50.

The directory services node 60 may typically be a server 54 in a network. However, it may be installed in any node 52. To support directory services, a directory services node 52 may typically include a network card 26 for connecting to the network 30, a processor 12 for processing software commands in the directory services executables, a memory device 20 for operational memory as well as a non-volatile storage device 16 such as a hard drive 16. Typically, an input device 22 and an output device 24 are provided for user interaction with the directory services node 60. In general, any number of workstation nodes 58, 62 may exist in a network 30, within some practical limit. Any network 30, 50 may be part of, and connect to the Internet 64.

Figure 2:
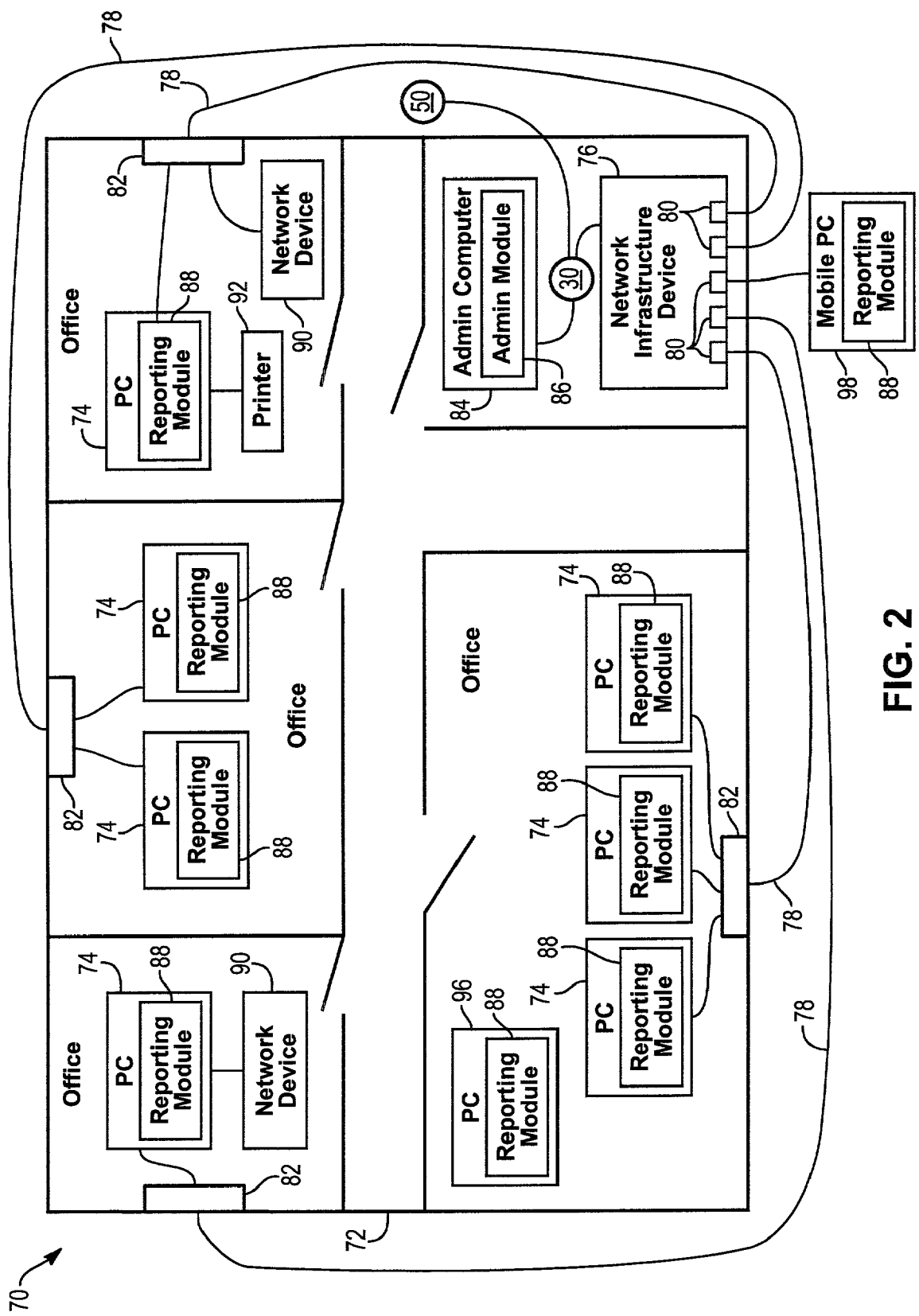
FIG. 2 is a schematic block diagram of various configurations of network devices connected to a network at a selected site, along with implementation schemes for implementing apparatus and methods in accordance with the invention.

Referring now to FIG. 2 while continuing to refer to FIG. 1, a system 70 may be installed at a network site 72, which may be an office or building belonging to an organization or the like. The system 70 may include several nodes 74 having any or all of the attributes of a node 11 discussed hereinbefore. The nodes 74 may be personal computers (PCs) 74 or workstations 74. In the depicted embodiment, each node 74 operably connects to an intelligent network infrastructure device 76 via a structural cabling segment 78 and a network connection 82 or a jack 82. In the depicted embodiment, each structural cabling segment 78 also operably connects to a distinct port 80 of the network infrastructure device 76. A network infrastructure device 76 may be any intelligent network device including without limitation a switch, a router, a hub, or the like.

The network infrastructure device may also operably connect to a network 30, which in turn may operably connect to a network 50 in any configuration, as described hereinbefore. The network 30 may include an admin computer 84, which may be a server 54, as described hereinbefore. The admin computer 84 preferably operably connects to the network 30, and to the nodes 74 through the network 30. The admin computer 84 may host an admin module 86, which may provide selected functionalities in accordance with the invention. Individual nodes 74 may host a reporting module 88 for gathering and providing selected information via the jacks 82 and structural cabling 78 to the admin module 86 of the admin computer 84 in accordance with the invention.

A system 70 may also include other network devices 90, such as network printers 92, network scanners 94, and the like. A system 70 may also include one or more standalone nodes 96 or standalone PCs 96. Like individual network nodes 74, individual standalone nodes 96 may host a reporting module 88, which may gather selected information pertaining to individual nodes 96 and operably connected devices to be reported to the admin computer 84 via removable media, such as a floppy diskette or the like. Moreover, a system 70 may include one or more mobile nodes 98 or mobile PCs 98, which may also individually host a reporting module 88. Mobile nodes 98 may connect to the network infrastructure device 76 via a dial-up connection or the like. The reporting module 88 of a mobile node 98 may gather selected information pertaining to the hosting mobile node 98 and operably connected devices to be reported to the admin computer 84, when the mobile node 98 operably connects to the network infrastructure device 76 via dial-up connection or the like.

Figure 3:
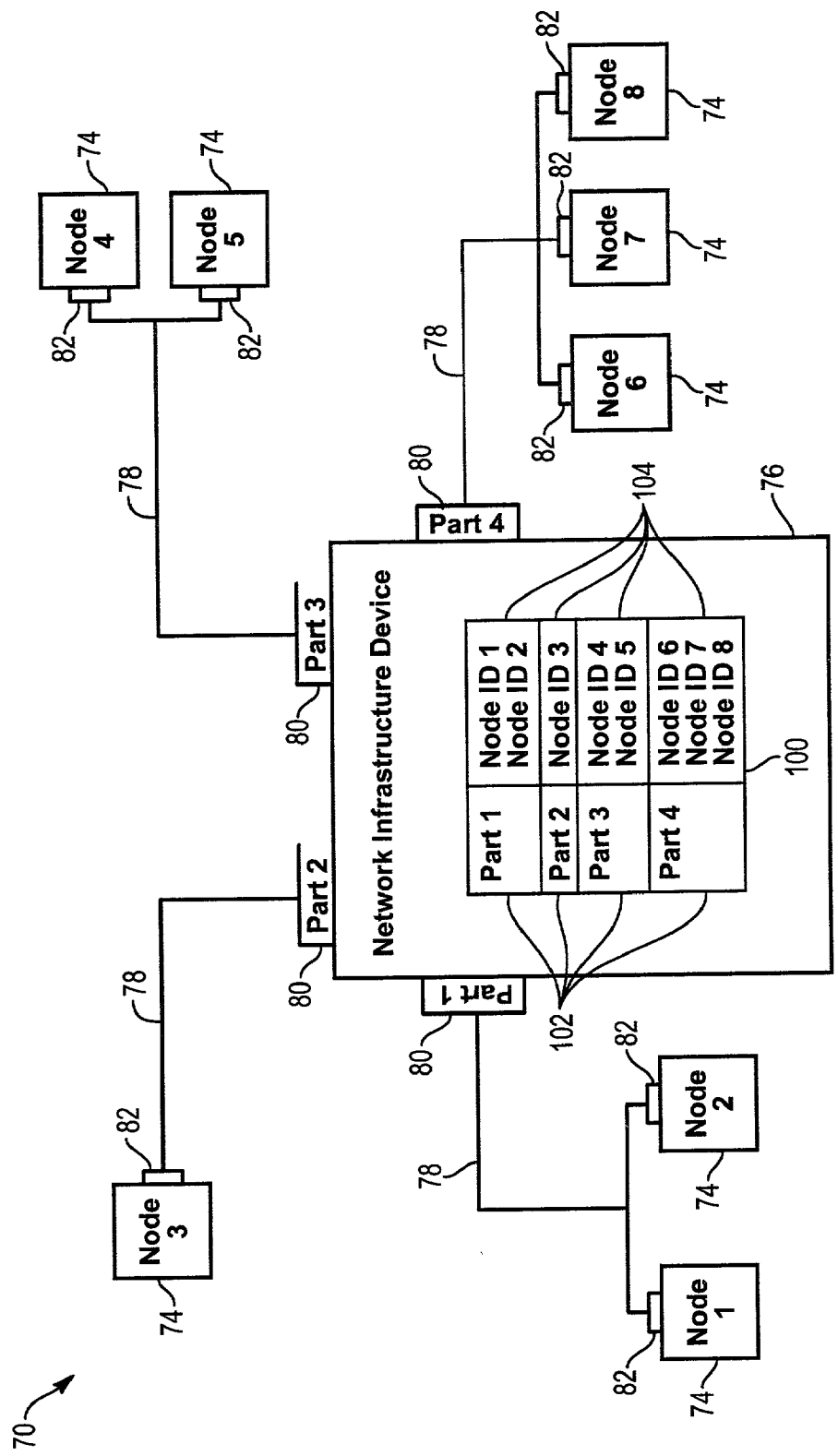
FIG. 3 is a schematic block diagram of a network connection table of a network infrastructure device corresponding to an illustrated configuration of a typical network.

Referring to FIG. 3 while continuing to refer to FIGS. 1 and 2, one embodiment of a system 70 is shown that includes eight nodes 74 connected to a network infrastructure device via jacks 82, structural cabling 78, and ports 80. As shown in the depicted embodiment, a network infrastructure device 76 may maintain end point connection information 100 in a connection table 100 including port numbers 102 bound to node identification numbers 104. In other words, in the depicted embodiment, the connection table 100 tracks by identification number which nodes are operably connected to each port 80 of the network infrastructure device 76.

Typically, network infrastructure devices, such as device 76, each have a processor and memory capable of storing status variables and other values in memory that are continuously changed and updated as such devices operate. The status of a network infrastructure device 76 may be ascertained by transmitting a message requesting information over the network to a software program or agent running on the target device 76. In response, the agent may send a message over the network to the requesting station. Such communications are typically carried out according to an agreed-upon protocol, such as the Simple Network Management Protocol (SNMP).

Accordingly, in the depicted embodiment, the reporting module 88 of any node 74 may transmit a message, typically using SNMP, to obtain the information contained in connection table 100. A reporting module 88 hosted on a node 74 may then use information from the connection table 100 to determine to which port 80 and structural cabling 78 the particular node 74 is connected. In other words, the reporting module 88 of a node 74 may function to determine the "end point connection" information corresponding to the hosting node 74 and any other network devices 90 local to the node 74. The reporting module 88 of a node 74 may then report the "end point connection" information corresponding to the node 74 and other local network devices 90.

Figure 4:
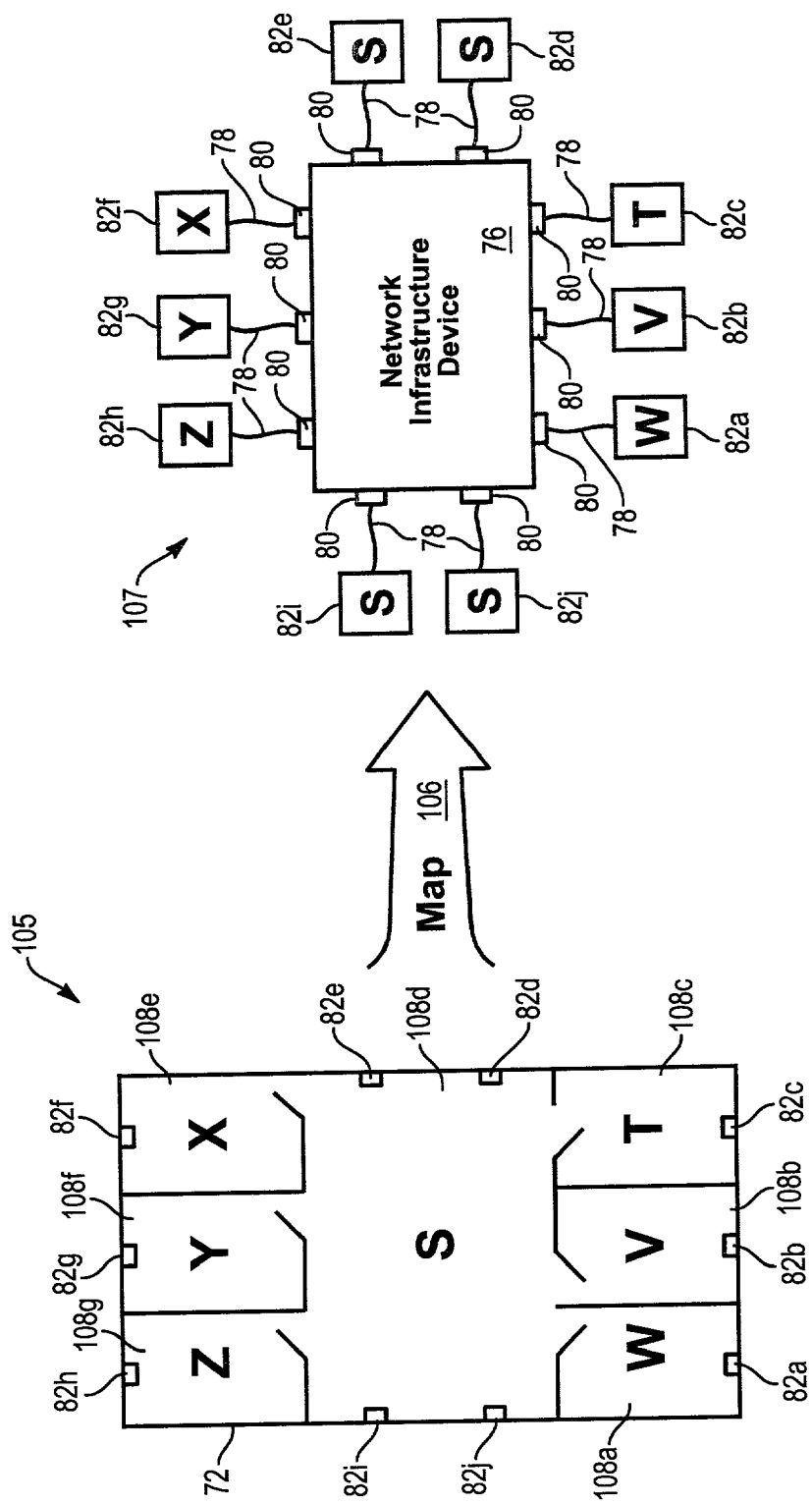
FIG. 4 is a schematic block diagram illustrating the mapping of a physical site at which a network is installed to a schematic depicting the network installed at the physical site.

Referring to FIG. 4 while continuing to refer generally to FIGS. 1-3, the physical layout of a network site 72 may be mapped 106 to the structural layout 107 of the structural cabling 78 of a computer network, such as a network 30. In the depicted embodiment, the map 106 of the network site 72 includes physical network connections 82a-i or jacks 82a-i and network physical locations 108a-h. As shown in FIG. 4, the physical layout 105 of a network site 72 may be associated with or mapped to the schematic and physical layout of structural cabling 78 of a network 30 or portion of a network 30 installed at a network site 72. Of course, since the structural cabling 78 installed at the network site 72 is connected, either directly or indirectly, to one or more network infrastructure devices 76, a port 80 of a network infrastructure device 76 may be identified as corresponding to each physical network connection 82 physically installed at the network physical locations 108.

The scope of the invention is as broad as generally described above. The illustrations contained in FIGS. 5-15 are merely representative of certain, presently preferred embodiments of the invention and should not be interpreted to be limiting of the scope of the invention broadly described above. Those presently preferred embodiments of the invention will be best understood by reference to FIGS. 5-15.

Figure 5:
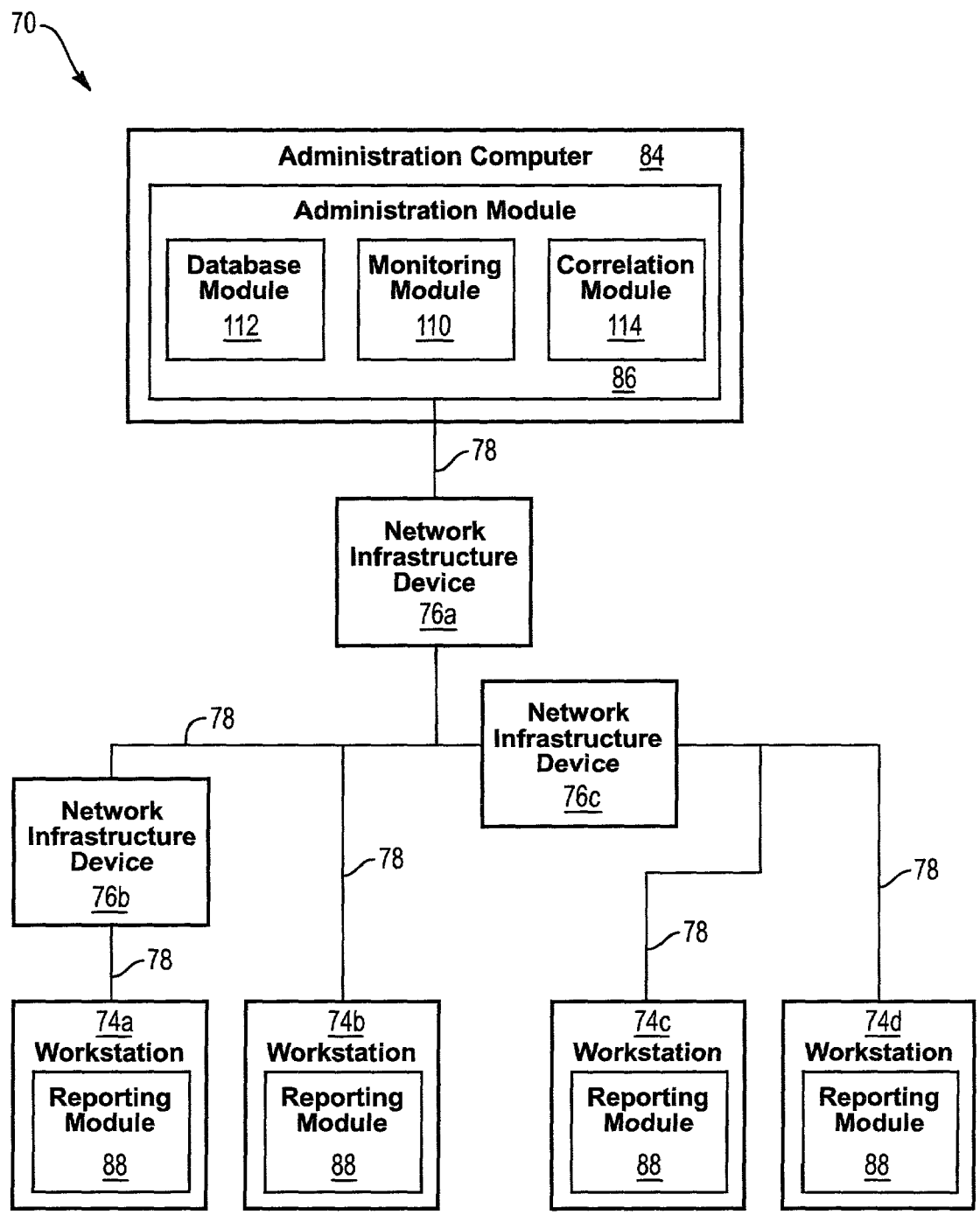
FIG. 5 is a schematic block diagram of data structures suitable for implementing at least one embodiment of an apparatus and method in accordance with the present invention.

Referring now to FIG. 5 while continuing to refer generally to FIGS. 1-4, in certain embodiments, a system 70 may include one or more admin computers 84 operably connected, typically via structural cabling 78, to one or more nodes 74, shown in FIG. 5 as workstations 74a-d. In the depicted embodiment, the system 70 also includes network infrastructure devices 76a-c. The depicted system 70 also includes three network infrastructure devices designated as devices 76a-c.

As shown, the admin computer 84, which may be a server 54, typically hosts an admin module 86. In the depicted embodiment, the admin module 86 includes a monitoring module 110 for monitoring the connection of devices to a network and changes in such connections, a database module 112 for storing network device connection information, and a correlation module 114 for associating network devices with network physical locations. Workstations 74, such as workstations 74a-d, typically each host a reporting module 88 that typically function to ascertain end point connection information 100 from the closest network infrastructure device 76 with respect to the hosting workstation 74 and other local network devices 90. Each reporting module 88 also typically reports such "endpoint connection information" to the admin module 86 hosted on the admin computer 84. For example, in the depicted embodiment, the network infrastructure device 76 closest to workstations 74c and 74d is network infrastructure device 76a, and the closest device 76 to workstation 74a is network infrastructure device 76b.

Figure 6:
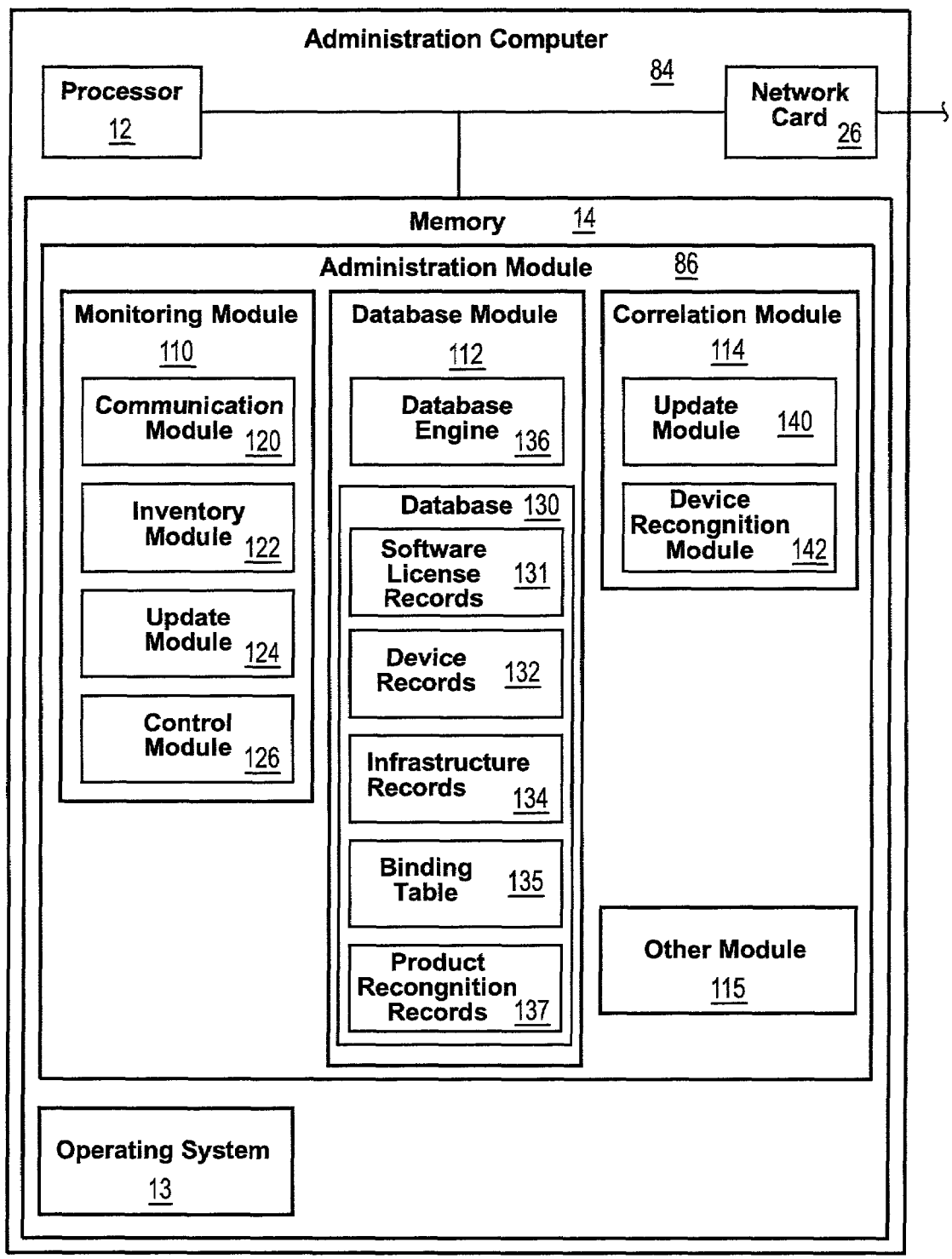
FIG. 6 is a schematic block diagram of an administration computer hosting selected data structures in accordance with the invention.

Referring to FIG. 6 while continuing to refer generally to FIGS. 1-5, an admin computer 84 may include a processor 12 for executing executable data structures, memory 14 for storing executable and operational data structures, and a network card 26 for connecting to a network 30 or other network. The memory device 14 of computer 84, may store an operating system 13 and an admin module 86 for providing functionality in accordance with the invention.

In the depicted embodiment, the admin module 86 may include a monitoring module 110, a database module 112, a correlation module 114, and an other module 115. In one embodiment, the admin module 86, as every other module in accordance with the invention, may be any thing from a single machine-level instruction, to an entire multimedia application. That is, an individual module 86, 88, 110, 112, 114, and 115, including all sub-modules thereof, can physically be stored in any size, shape, configuration, on any number of computers, in order to execute its function. Thus, the monitoring module 110 is that code that is logically executed in order to effect the monitoring process for obtaining copies of end point connection information 100 for every device on the network and updating the copies such end point connection information as devices are moved, added, and/or removed from the network. Meanwhile, the database module is responsible for storing copies of end point connection information 100 corresponding to all network devices in device records 132 of a database 130.

The correlation module 114 is responsible for correlating or binding the device records 132 to infrastructure records 134, which store the details of the physical layout 105 of the network. Other modules 111 may be created to provide other services, or to support the monitoring, database, and correlation processes.

In certain embodiments, the admin module 86 may include a monitoring module 110. The monitoring module 110 may include a communication module 120 responsible for communicating with reporting modules 88, an inventory module 122 responsible for conducting a comprehensive inventory of devices connected to a network, and an update module 124 responsible for monitoring changes to the connection status of devices to a network. In other embodiments, a monitoring module 110 may also include a control module 126 for managing the functions of the monitoring module 110. Changes in connection status of devices to a network may include without limitation addition of devices, removal of devices, or movement of devices from a first physical or logical location on a network to a second such location.

In certain embodiments, the admin module 86 may include a database module 112. The database module 112 may either include, or may access outside itself, a database engine 136 for managing a database 130, which may include software license records 131, device records 132, infrastructure records 134, a binding table 135 or binding tables 135, and product recognition records 137. Typically, the records 131, records 132, records 134, binding table 135, and records 137 constitute a database 130.

Meanwhile, a database system typically includes a standard, well known, reliable database engine 136 operating according to some schema to make, create, edit, retrieve, and otherwise manage database records 131, 132, 134, 135, 137. The software license records 131, device records 132, infrastructure records 134, binding table 135, and product recognition records 137 may be configured in numerous ways.

In general, the database engine 112 may be any commercial database engine, such as those produced under the current ODBC standards, the commercial products such as Oracle™, Sybase™, and others known in the art. The database records 131, 132, 134, 135, 137 may be those created in accordance with a schema, or hierarchy in any format, whether conventional, relational database, lists, object-oriented databases, or the like.

In certain embodiments, the admin module 86 may include a correlation module 114. A correlation module 114 may include a matching module 140 for binding network devices to physical layouts and a device recognition module 142 capable of recognizing a wide range of network devices. The matching module 140 may be responsible to present the device records 132 and infrastructure records 134 to a network system administrator, who can then match the device records 132 to the infrastructure records to create the binding table 135. Once the binding table 135 has been created for the system 70, the update module 124 of the monitoring module 110 may use information stored in the-device records 132, the infrastructure records 134, and the binding table 135 to automatically update the database 130 as network devices are added, moved, and/or removed from the network.

In selected embodiments, the matching module 140 may also be responsible to determine whether an organization possesses software licenses, as set forth in the software license records 131, corresponding to software installed on nodes 74 and other network devices 90. Accordingly, the matching module 140 may be configured to assess whether a network site 72, for example, is running unauthorized software. Moreover, in certain embodiments, the matching module 140 may be configured to use information stored in product recognition records 137 to recognize network nodes 74, network devices 90, and/or software installed on devices 74, 90. The matching module 140 may also be configured to use information stored in the product recognition records 137 to obtain and store additional information pertaining to recognized devices 74, 90. For example, the product recognition records 137 may contain information regarding product nomenclature and/or features that may be productively stored in selected device records 132.

Figure 7:
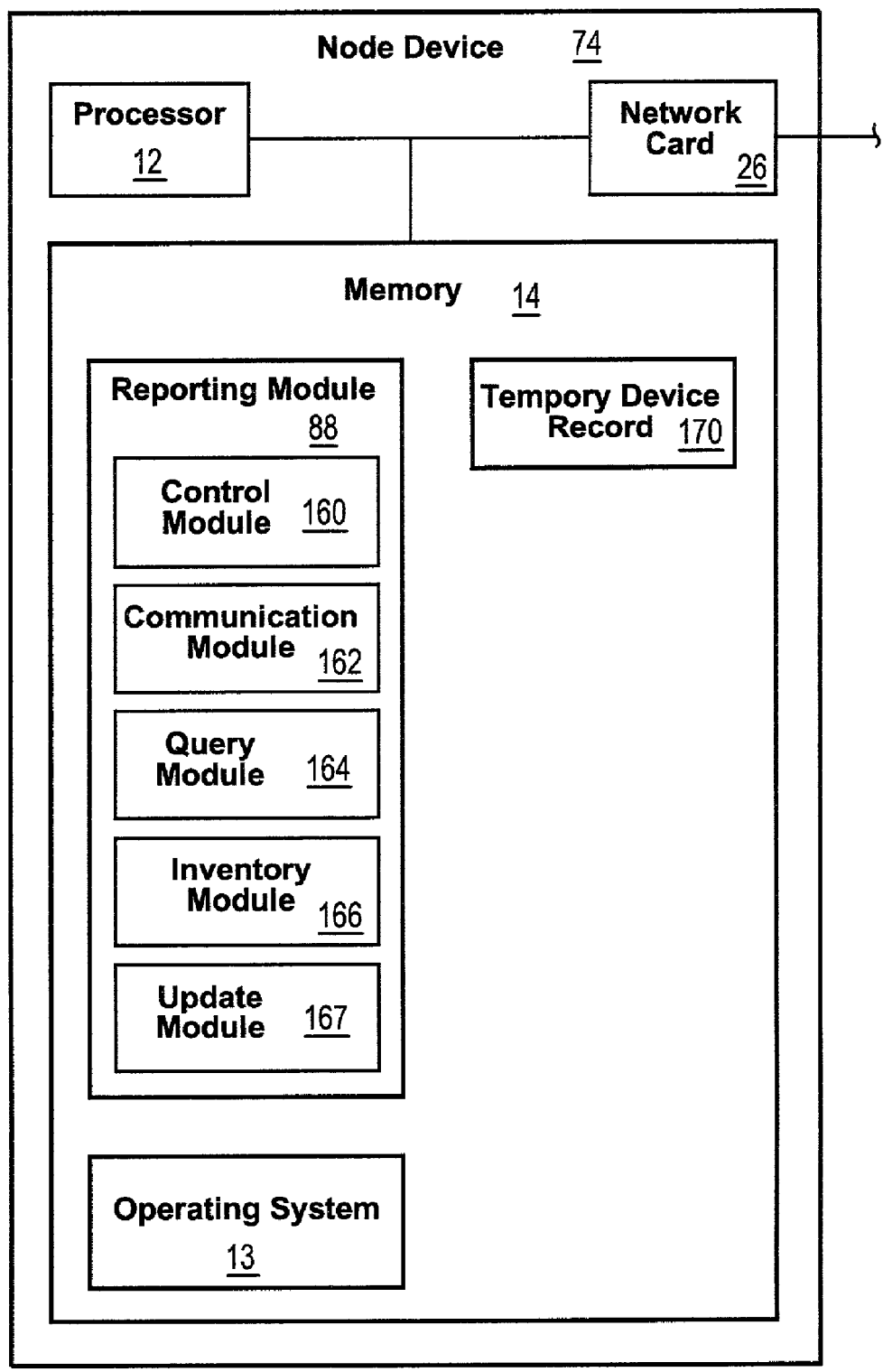
FIG. 7 is a schematic block diagram of a node device hosting selected data structures in accordance with the invention.

Referring to FIG. 7 while continuing to refer generally to FIGS. 1-6, a node device 74 may include a processor 12 for executing executable data structures, memory 14 for storing executable and operational data structures, and a network card 26 for connecting to a network 30 or other network. The memory device 14 of node 74, may store an operating system 13 and a reporting module 88 for providing functionality in accordance with the invention.

In certain embodiments, a reporting module 88 may include a control module 160 for controlling the functions of reporting module 88, a communication module 162, a query module 164, an inventory module 166, and an update module 167. The communication module 162 may be responsible for receiving requests from the admin module 86 and transmitting information, including without limitation end point connection information 100, to the admin module 86. The query module 164 may be responsible for obtaining end point connection information 100 from network infrastructure devices 76 pertaining to the node 74 and other local network devices 90.

The inventory module 166 may be responsible to identify network devices 90 local to the node 74 hosting the reporting module 88 and obtain end point connection information corresponding to such network devices 90. In certain embodiments, the inventory module 166 may also be responsible to detect and transmit software and hardware configuration information corresponding to a node 74 and other network devices 90. The update module 167 may detect changes in end point connection information 100 pertaining to the node 74 and identified local network devices 90.

In certain embodiments, a reporting module 88 of a node 74 may also store one or more temporary device records 170. A temporary device record 170 may include end point connection information 100 and other information pertaining to the node 74 and other local network devices 90. A temporary device record 170 may include all information requested by an admin module 86 to create or update device records 132 corresponding to nodes 74 and/or other network devices 90.

Referring now to both FIGS. 6 and 7, an admin module 86 and a reporting module 88 may be configured in any suitable arrangements to execute on one or more processors 12. Thus, distributed processing, client/server architectures, application server architectures, and the like may all be used, in order to host an admin module 86 and a reporting module 88. An admin module 86 and a reporting module 88 may include all the functionalities of an apparatus and method in accordance with the invention. Typically, an admin module 86 interacts with a reporting module 88 in a server/client relationship wherein the reporting module 88 supports the admin module 86 by feeding particular individual functional processes or information to the admin module 86. Alternatively, the functions of an admin module 86 and a reporting module 88 could be hosted on a single computer 11 with the separate modules operating as a single software module.

Referring to FIG. 8 while continuing to refer to FIG. 4, each infrastructure record 180 of the infrastructure records 134 in accordance with the invention may include several fields that can uniquely identify a physical location at which a node 74 or other network device 90 is installed. For example, an infrastructure record 180 may include any or all of the following fields: a location identification field 182, a country field 184, a state/province field 186, a site name field 188, a site address field 190, a building identification field 192, a room identification field 194, a room position field 196, and other fields 198 that may be necessary or useful in uniquely identifying a physical location 108. In certain embodiments, not all of the foregoing fields are necessary to uniquely identify a physical location 108 of a network site 72 in accordance with the invention. In other embodiments, additional fields 198 may be necessary to uniquely identify physical location 108.

Referring to FIG. 9 while continuing to refer to FIGS. 1-8 generally, each device record 133 of the device records 132 in accordance with the invention may include several fields that store the end point connection information 100 corresponding to a node 74 or network device 90. For example, a device record 133 may include any or all of the following fields: a device identification number field 210, device end point connection information field 211, a NIC number field 212, a device type field 214, a manufacturer field 216, a model field 218, a memory field 220, a disk space field 222, an attached devices field 224, an installed software field 226, a hardware nomenclature field 228, a registration status field 227, a last updated field 229, and other fields 230 that may store information necessary or useful in providing functionality in accordance with the invention.

Figure 10:
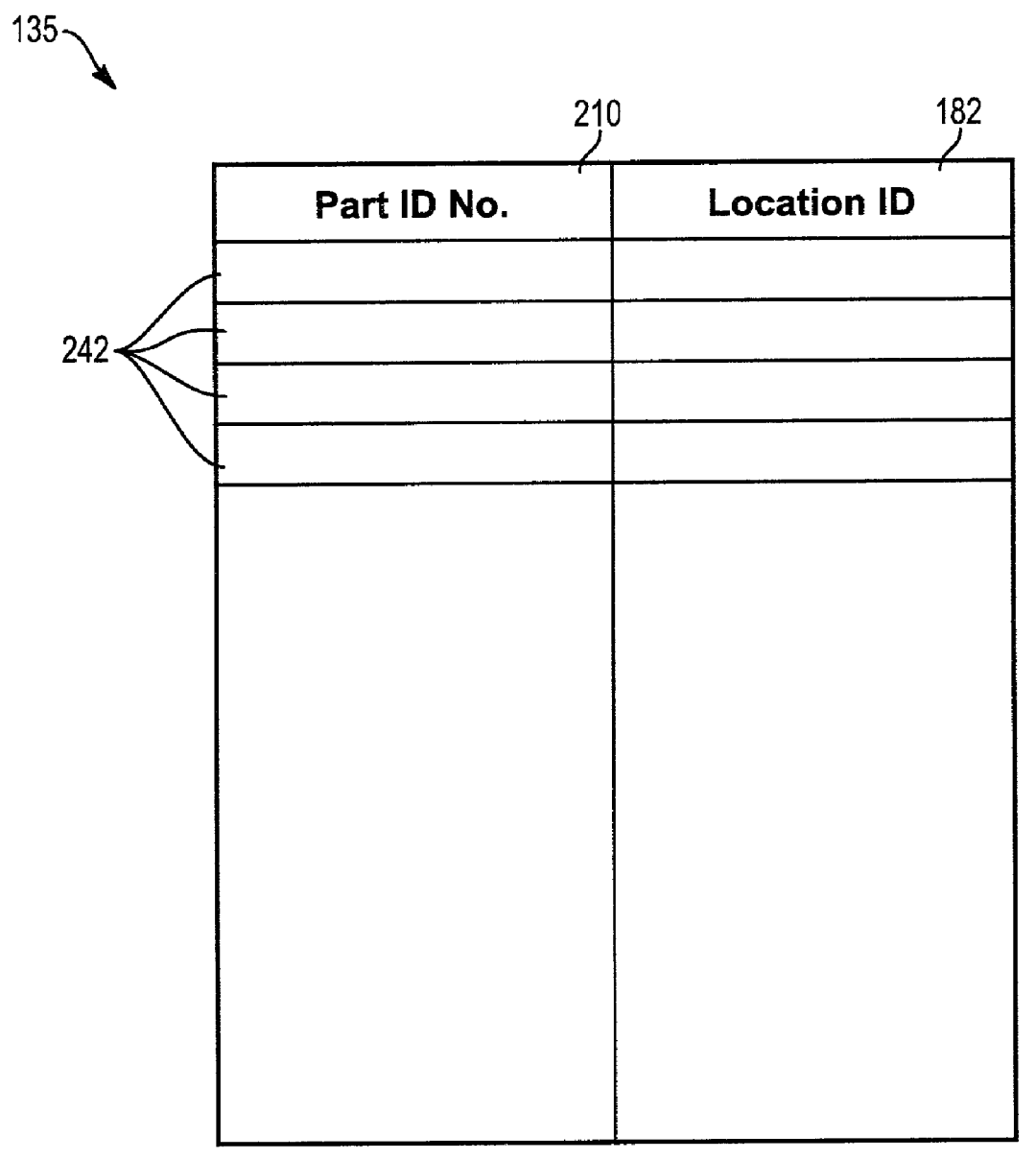

Referring to FIGS. 9 and 10, in certain embodiments, a binding table 135 may be created as a result of the binding or associating of end point connection information 100 corresponding to a node 74 or other network device 90 to a physical location 108. In other words, the resulting binding or association between network devices 74, 90 and physical locations 108 may be stored in a binding table 135. Typically, a binding table 135 comprises a variety of records 242 including a port identification field 211 or port identifier field 211 and a location identification field 182 or location identifier field 182.

Referring to FIG. 9, alternatively, a device record 133 may serve as a binding record 242 so long as a location identifier 182 is included in the device record 133, along with the device identifier 210. Accordingly, the device records 132 may function as a binding table 135 in accordance with the invention. In certain embodiments, a separate and distinct binding table 135, apart from the device records 132, may not, therefore, exist.

Figure 11:
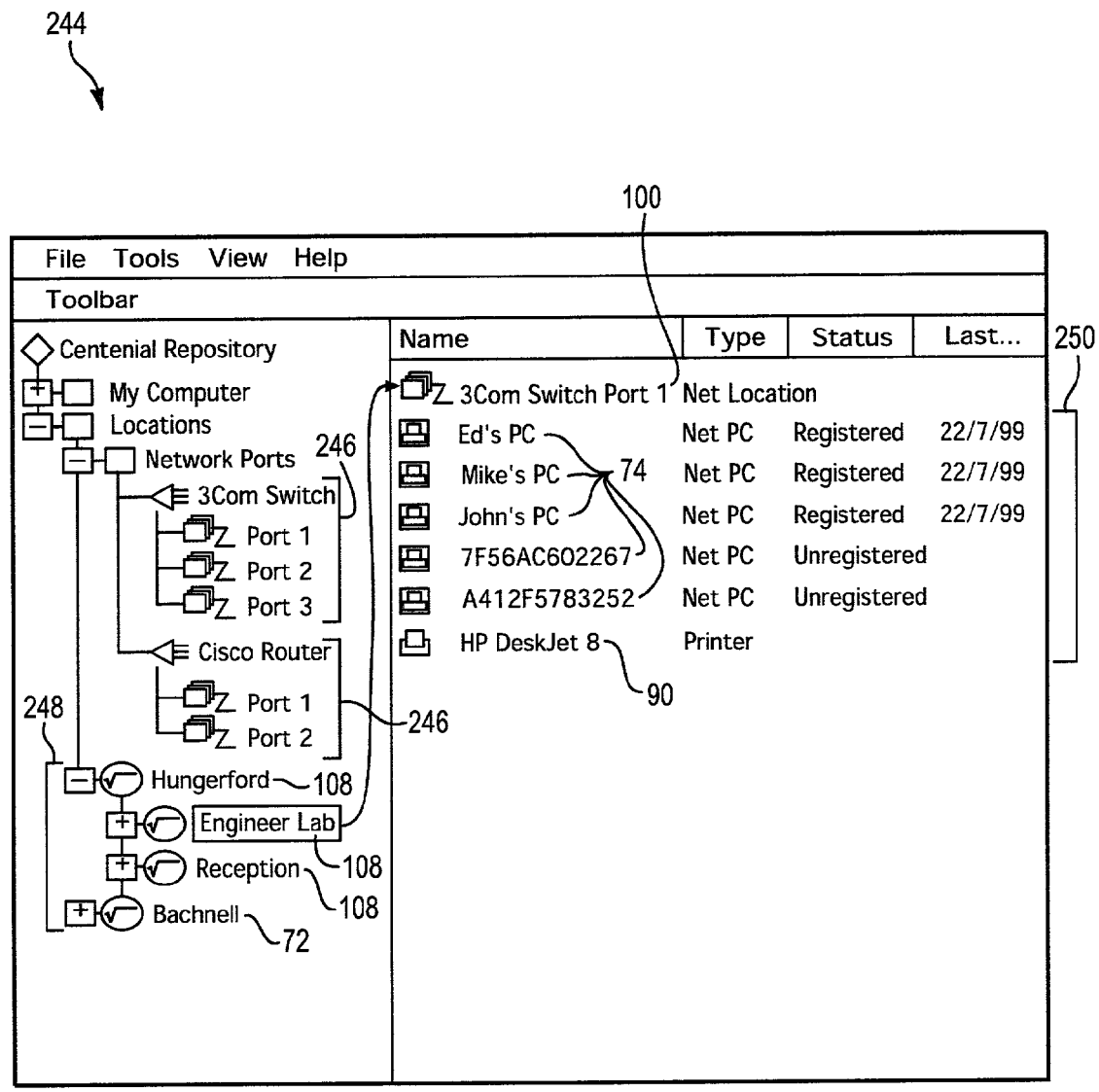
FIG. 11 is an elevation view of one embodiment of a computer interface for binding infrastructure records to device records in accordance with the invention.

Referring to FIG. 11, the database module 112 may be viewed and updated via a database user interface 244. In certain embodiments, a database user interface 244 may include an interface 246 for viewing and updating network infrastructure devices 76 and end point connection information 100 corresponding thereto. Moreover, a user interface 244 may include an interface 248 for viewing and updating network sites 72 and physical locations 108. In selected embodiments, a user interface 244 may also include an interface 250 for viewing and updating the binding or association between network devices 74, 90 and end point connection information 100.

Figure 12:
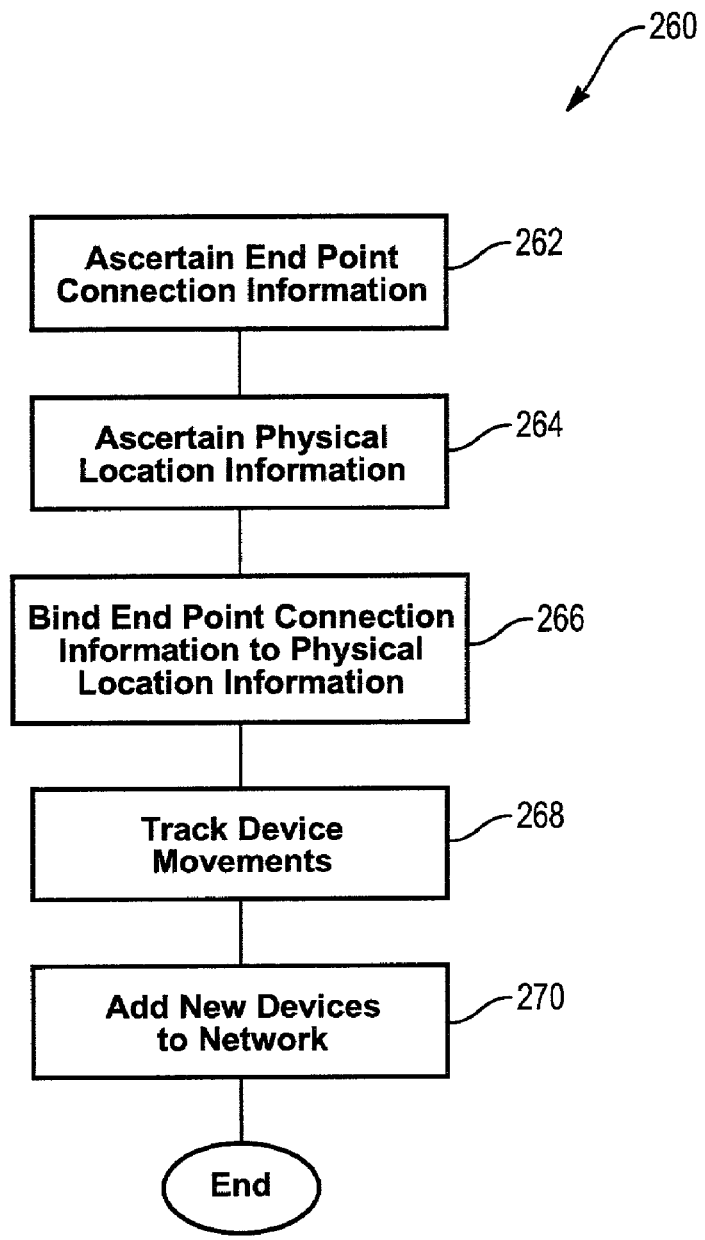
FIG. 12 is a schematic block diagram of one embodiment of a process for binding infrastructure records to device records and tracking changes to those bindings in accordance with the invention.

Referring to FIG. 12, a process 260 in accordance with the invention may include ascertaining 262 end point connection information 100 corresponding to one or more network devices 74, 90 connected to a network 30. The process may also include ascertaining 264 physical locations 108 corresponding to the network devices 74, 90 connected to the network 30. Once such end point connection information 100 and physical locations 108 are known, the end point connection information 100 may be bound 266 or associated 266 to the physical locations 108, typically resulting in a binding table 135. Subsequently, movements, additions, and/or deletions of devices 74, 90 may be tracked 268. Of course, network devices 74, 90 are often added 270 to typical networks 30.

Figure 13:
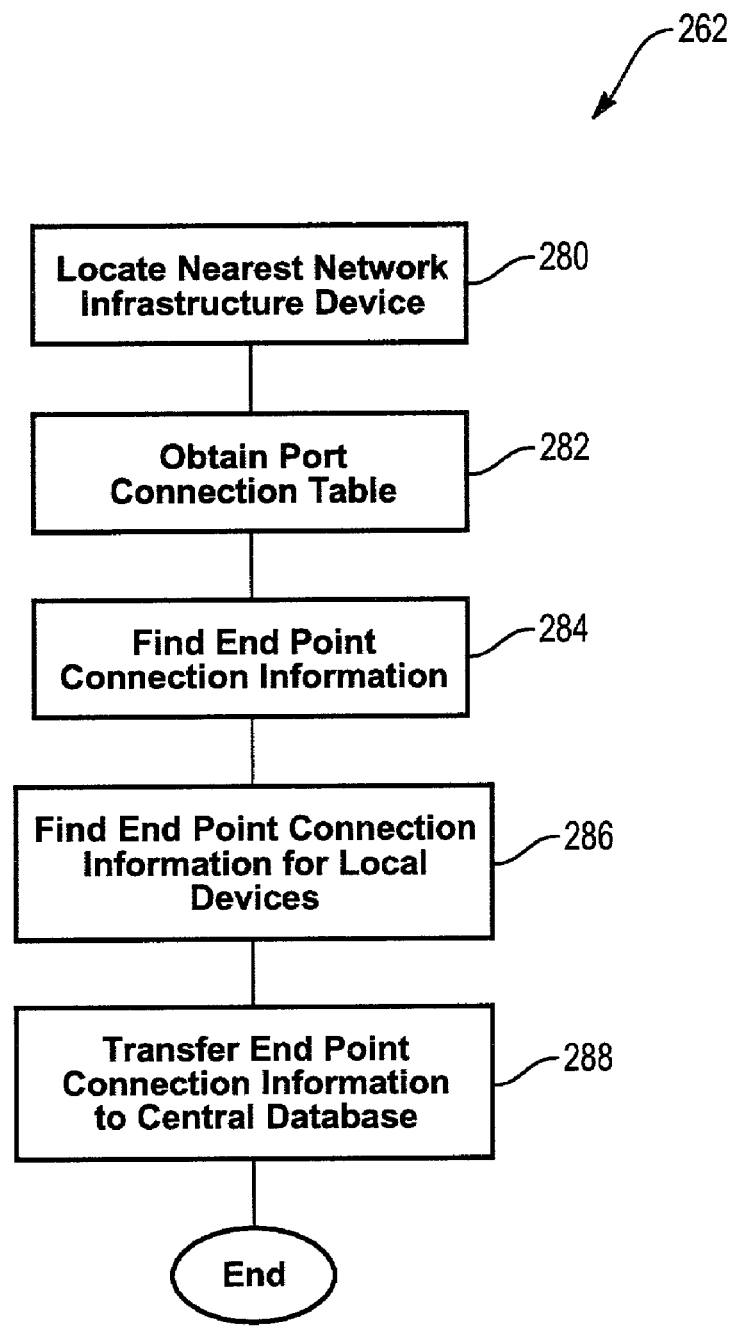
FIG. 13 is a schematic block diagram of one embodiment of the step of ascertaining end point connection information of FIG. 12 in accordance with the invention.

Referring to FIG. 13, one embodiment of a process 262 for ascertaining end point connection information may include a node 74 locating 280 the nearest network infrastructure device 76. The node 74 may query the network infrastructure device 76 to obtain 282 the port connection table 100 or end point connection information 100 corresponding to the network infrastructure device 76. The node 74 may then find 284 the particular end point connection information 100 corresponding to the node 74, which is typically an identifier to a particular port 80 of the network infrastructure device 76 to which the node 74 is connected via structural cabling 78. The node 74 may also find 286 the end point connection information 100 corresponding to other network devices 90 local to the node 74, which again is typically an identifier to a particular port 80 or ports 80 of the network infrastructure device to which the network devices 90 are connected via structural cabling 78. The node 74 may then transfer 288 the collected end point connection information to the central database 112 for storage in the device records 132 thereof.

Figure 14:
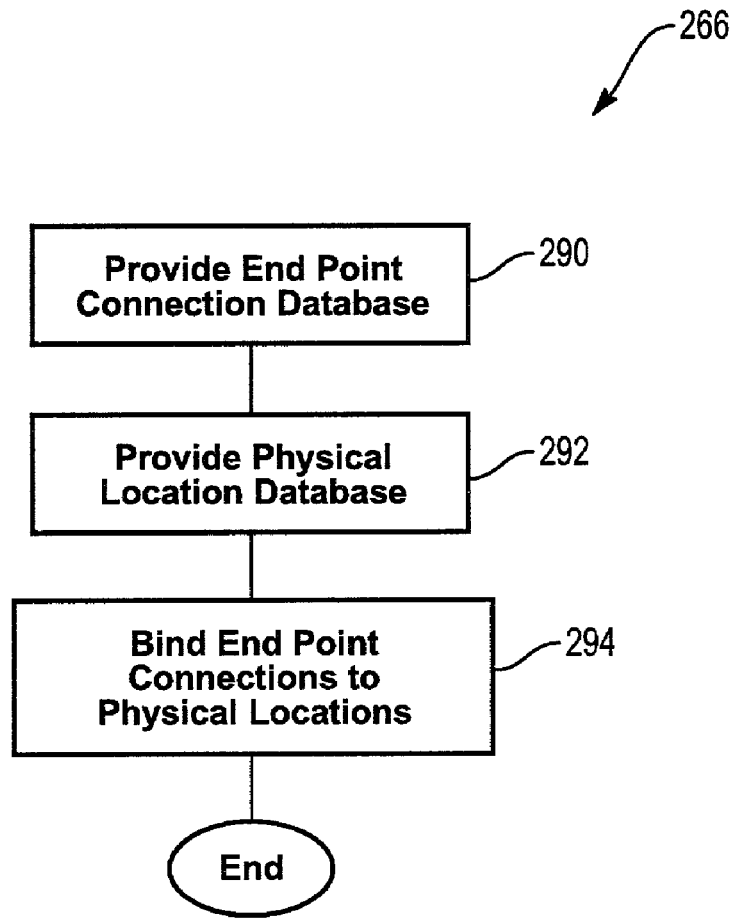
FIG. 14 is a schematic block diagram of one embodiment of the step of binding end connection information to physical location information of FIG. 12 in accordance with the invention.
Figure 15:
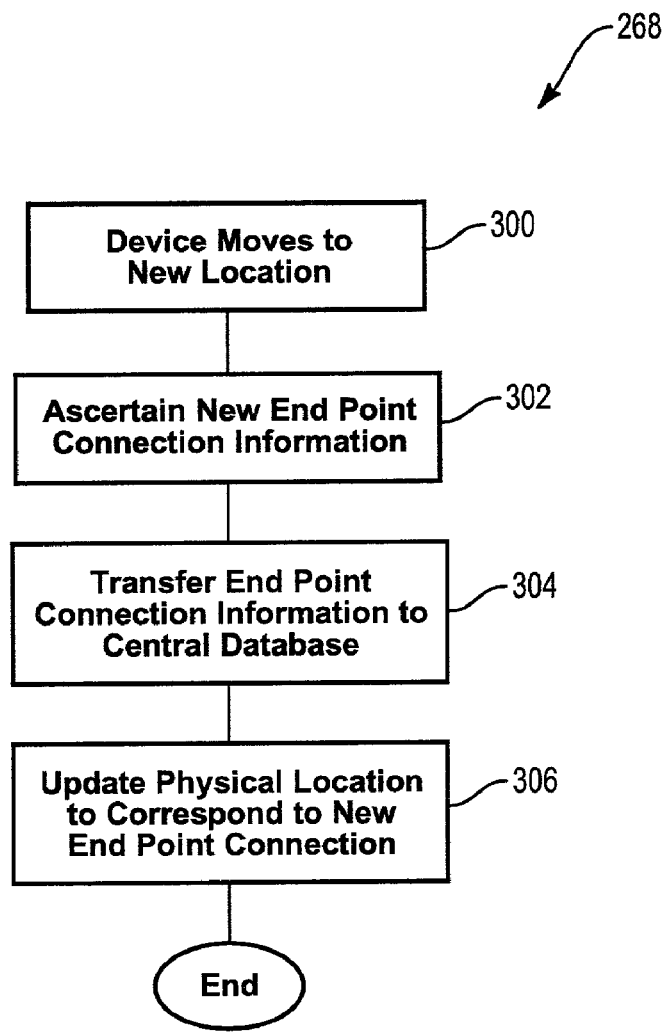
FIG. 15 is a schematic block diagram of one embodiment of the step of tracking device movements of FIG. 12 in accordance with the invention.

Referring to FIG. 14, one embodiment of a process 266 for binding end point connection information 100 to physical locations 108 may include providing 290 an end point connection information database, which information is typically stored in the device records 132 of the database 112. The process 266 may also include providing 292 a physical location database, which information is typically stored in the infrastructure records 134 of the database 112. Moreover, the process 266 may include binding 294 individual device records, each containing end point connection information corresponding to a network device 74, 90, to individual infrastructure records 134 to form a binding table 135.

Referring to FIG. 14, one embodiment of a process 268 for tracking movements of network devices 74, 90 may include the movement 300 of a network device 74, 90. Upon such movement of a node 74, the node 74 may ascertain 302 the new end point connection information 100 corresponding to the node 74. Upon such movement of an other network device 90, a node 74 local to the network device 90 may ascertain 302 the new end point connection information 100 corresponding to the network device 90. Such node 74 may then transfer 304 the new end point connection information 100 corresponding to the device 74, 90 to the corresponding device record 133. Based on information contained in the binding table 135, the device 74, 90 would automatically be bound to the physical location 108 corresponding to the new end point connection information 100.

The present invention may be embodied in other specific forms without departing from its spirit or essential characteristics. The described embodiments are to be considered in all respects only as illustrative, and not restrictive. The scope of the invention is, therefore, indicated by the appended claims, rather than by the foregoing description. All changes which come within the meaning and range of equivalency of the claims are to be embraced within their scope.

What is claimed and desired to be secured by United States Letters Patent is:

1. An apparatus for physical detection and tracking of devices on a computer network disposed within a building comprising a first room and plurality of rooms, distinct from the first room, the apparatus comprising:
   a plurality of outlets, each outlet thereof housed within a room of the plurality of rooms and containing substantially exclusively, as its electronically active elements, electrical conductors carrying data signals unprocessed therethrough;
   a network infrastructure device operably connected to the network and selected from the group consisting of a switch, a router, and a hub;
   the network infrastructure device housed within the first room and comprising a plurality of ports, each port thereof operably connected to an outlet of the plurality of outlets corresponding exclusively thereto;
   a plurality of workstations, each workstation thereof located in a room of the plurality of rooms and operably connected to an outlet of the plurality of outlets housed therein;
   the network infrastructure device, further storing and automatically updating a connection table mapping each port of the plurality of ports to an identification corresponding to a workstation of the plurality of workstations connected thereto and independent from any identification of any room of the plurality of rooms;
   a processor connected to the network, for executing executable data structures; and
   a memory device operably connected to the processor for storing the executable data structures and associated operational data structures, the executable and operational data structures comprising:
      a reporting module configured to query the network infrastructure device and obtain end point connection information corresponding to a first workstation of the plurality of workstations, the end point connection information comprising information from the connection table identifying a port of the plurality of ports through which the first workstation connects to the network infrastructure device; and
      a correlation module storing a correlation table relating end point connection information to the plurality of rooms, the correlation module programmed to receive from the reporting module the end point connection information and consult the correlation table to identify a room of the plurality of rooms housing the first workstation.

2. The apparatus of claim 1, wherein the reporting module further comprises a communication module configured to transmit the end point connection information to a central database.

3. The apparatus of claim 1, wherein the reporting module further comprises an update module configured to detect a change of end point connection information corresponding to the first workstation.

4. The apparatus of claim 1, wherein the reporting module further comprises an inventory module configured to detect a network device local to the first workstation and obtain end point connection information corresponding to the network device.

5. The apparatus of claim 1, further comprising a monitoring module configured to receive end point connection information from the reporting module.

6. The apparatus of claim 1, wherein the correlation module further comprises a device recognition module configured to identify the nomenclature of the first workstation based on product recognition records.

7. The apparatus of claim 1, wherein the reporting module further comprises an inventory module configured to detect and transmit software and hardware configuration information corresponding to the first workstation.

8. The apparatus of claim 1, wherein the reporting module further comprises an inventory module configured to detect and transmit software and hardware configuration information corresponding to a second workstation.

9. A method for physical detection and tracking of devices on a computer network, the method comprising:
   identifying a building comprising a first room and a plurality of rooms distinct from the first room;
   identifying a computer network housed within the building and comprising
      a plurality of outlets, each outlet thereof containing substantially exclusively, as its electronically active elements, electrical conductors carrying data signals unprocessed therethrough, at least one outlet of the plurality of outlets being housed within each room of the plurality of rooms,
      a network infrastructure device selected from the group consisting of a switch, router, and hub, the network infrastructure device housed within the first room and comprising a plurality of ports, each port thereof operably connected to an outlet of the plurality outlets corresponding exclusively thereto,
      a plurality of devices housed within the plurality of rooms, each device of the plurality of devices connecting to the network infrastructure device via an outlet of the plurality of outlets;
   storing and automatically updating, by the network infrastructure device, a connection table mapping each port of the plurality of ports to a corresponding device of the plurality of devices connected thereto;
   installing and running, after the storing, reporting software on a first device of the plurality of devices;
   installing and running, after the storing, correlating software on a device of the plurality of devices, the correlating software comprising a binding table mapping each port of the plurality of ports of the network infrastructure device to a corresponding room of the plurality of rooms;
   directing, by the reporting software, the first device to query the network infrastructure device and obtain from the connection table a port identification corresponding to the first device; and
   determining, by the correlating software, the location of the first device by locating the port identification within the binding table and retrieving from the binding table information designating a room of the plurality of rooms mapped thereto.

10. The method of claim 9, wherein the query comprises use of Simple Network Management Protocol (SNMP).

* * * * *